US007924861B2

(12) United States Patent
Baba et al.

(10) Patent No.: US 7,924,861 B2
(45) Date of Patent: Apr. 12, 2011

(54) SIGNAL COMMUNICATION APPARATUS AND SIGNAL COMMUNICATION SYSTEM

(75) Inventors: Tomo Baba, Ashigarakami-gun (JP); Kazuhiro Suzuki, Ashigarakami-gun (JP); Hisayoshi Mori, Ashigarakami-gun (JP); Kazuhiro Sakai, Ashigarakami-gun (JP); Junji Okada, Ashigarakami-gun (JP); Masao Funada, Ashigarakami-gun (JP); Shinobu Ozeki, Ashigarakami-gun (JP); Shinya Kyozuka, Ashigarakami-gun (JP); Takehiro Niitsu, Ashigarakami-gun (JP); Hidenori Yamada, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 907 days.

(21) Appl. No.: 11/272,691

(22) Filed: Nov. 15, 2005

(65) Prior Publication Data

US 2006/0277586 A1 Dec. 7, 2006

(30) Foreign Application Priority Data

May 20, 2005 (JP) ................................ 2005-147947

(51) Int. Cl.
*H04L 12/28* (2006.01)

(52) U.S. Cl. ...................................................... 370/419

(58) Field of Classification Search ........................ None
See application file for complete search history.

(56) References Cited

U.S. PATENT DOCUMENTS 4,607,289 A * 8/1986 Kurokawa ..................... 358/402
4,739,521 A * 4/1988 Akimoto ....................... 398/109
6,215,467 B1 * 4/2001 Suga et al. .................... 345/660
6,259,538 B1 * 7/2001 Amit et al. .................... 358/442
6,602,001 B1 8/2003 Hatano et al.
6,941,395 B1 * 9/2005 Galang et al. ................... 710/65
2002/0101440 A1 * 8/2002 Niikawa et al. ............... 345/698
2003/0035186 A1 2/2003 Ide et al.
2004/0027515 A1 * 2/2004 Itakura .......................... 349/110
(Continued)

FOREIGN PATENT DOCUMENTS

JP A 11-15425 1/1999
(Continued)

OTHER PUBLICATIONS

Jun. 8, 2010 Office Action issued in Japanese patent application No. 2005-147947 (with translation).

*Primary Examiner* — Chirag G Shah
*Assistant Examiner* — Salvador E Rivas
(74) *Attorney, Agent, or Firm* — Oliff & Berridge, PLC

(57) ABSTRACT

A signal communication apparatus includes a transmission component, a reception component and an identification information storage component. The transmission component is connectable to an information processing device and a signal propagation medium, and transmits an inputted image signal through the connected signal propagation medium. The reception component is connectable with an image display device and the signal propagation medium, receives the image signal transmitted from the transmission component through the connected signal propagation medium, and outputs the image signal to the connected image display device. The identification information storage component is removably attached to the transmission component, and stores identification information for identifying the image display device. The information processing device acquires the identification information from the identification information storage component connected to the connected transmission component, and outputs the image signal to the connected transmission component in accordance with at least a portion of the acquired identification information.

19 Claims, 2 Drawing Sheets

U.S. PATENT DOCUMENTS

| | | | | |
|---|---|---|---|---|
| 2004/0039927 | A1* | 2/2004 | Hazama et al. | 713/189 |
| 2004/0160639 | A1* | 8/2004 | Furukawa | 358/1.16 |
| 2005/0068257 | A1* | 3/2005 | Stephenson et al. | 345/50 |
| 2005/0068554 | A1* | 3/2005 | Yoshida | 358/1.9 |
| 2005/0228231 | A1* | 10/2005 | MacKinnon et al. | 600/180 |
| 2006/0020213 | A1* | 1/2006 | Whitman et al. | 600/478 |
| 2006/0132473 | A1* | 6/2006 | Fuller et al. | 345/204 |

FOREIGN PATENT DOCUMENTS

| | | |
|---|---|---|
| JP | A 11-340913 | 12/1999 |
| JP | A 2000-357998 | 12/2000 |
| JP | A 2001-195341 | 7/2001 |
| JP | A 2003-163816 | 6/2003 |
| JP | A 2005-51730 | 2/2005 |

* cited by examiner

SIGNAL COMMUNICATION APPARATUS AND SIGNAL COMMUNICATION SYSTEM

CROSS-REFERENCE TO RELATED APPLICATION

This application claims priority under 35 USC 119 from Japanese Patent Application No. 2005-147947, the disclosure of which is incorporated by reference herein.

BACKGROUND OF THE INVENTION

1. Field of the Invention

The present invention relates to a signal communication apparatus and a signal communication system, and particularly relates to a signal communication apparatus and signal communication system for propagating image signals.

2. Description of the Related Art

Conventionally, when electronic signals representing image information, such as DVI (Digital Visual Interface) signals or the like, are propagated from a computer to an image display device, such as a liquid crystal display device, a CRT or the like, in order to output the electronic signals from the computer in accordance with specifications of the image display device, the computer acquires identification information from the image display device. The identification information represents a model name of the image display device, setting values and so forth.

Standard specifications for this identification information are specified by the Video Electronics Standards Association (VESA). By acquiring the identification information, a computer can automatically identify the model name, setting values and the like of an image display device. Here, the DDC (Display Data Channel) protocol serves as a protocol for automatic identification, and the EDID (Extended Display Identification Data) standard serves as a standard for the identification information. By acquiring EDID information created in accordance with the EDID standard, a computer can identify the model name of an image display device, and setting values and the like.

A display is known (Japanese Patent Application Laid-Open (JP-A) No. 11-15425) in which, when EDID information is to be acquired in accordance with the DDC protocol, the EDID information is memorized at a memory of a DDC control section provided at the image display device. This EDID information is transmitted in the form of DDC signals.

DDC signals, DVI signals and suchlike are usually propagated by dedicated metal cables. However, when DVI signals of very high quality images, such as UXGA images, are to be propagated, frequencies of the signals are high. Consequently, there is a problem in that, because of mismatches of impedance in propagation with a metal cable, it is only possible to propagate up to about 5 meters.

Accordingly, as an apparatus for enabling long-distance communication of DVI signals, a signal communication apparatus is known (JP-A No. 2005-51730) which converts DVI image signals to optical signals and propagates the optical signals with an optical fiber, but propagates DDC signals with a metal cable.

However, with the signal communication apparatus described in JP-A No. 2005-51730, because the DDC signals with low signal frequencies are propagated by a metal cable, satisfactory signal propagation is difficult when the DDC signals are propagated over longer distances, because of attenuation of the signals. Moreover, if the signal communication apparatus is disposed outdoors and the DDC signals are propagated in the metal cable, there is a risk of damage to the apparatus, fire or the like being caused by a lightning strike on the metal cable, which is a problem.

SUMMARY OF THE INVENTION

The present invention has been made in view of the above circumstances and provides a signal communication apparatus and a signal communication system.

A first aspect of the present invention is a signal communication apparatus comprising: a transmission component, which is connectable with an information processing device and a signal propagation medium, and which transmits an inputted image signal through the connected signal propagation medium; a reception component, which is connectable with an image display device and the signal propagation medium, and which receives the image signal transmitted from the transmission component through the connected signal propagation medium, and outputs the image signal to the connected image display device; and an identification information storage component which is removably attached to the transmission component, the identification information storage component storing identification information for identifying the image display device, wherein the information processing device acquires the identification information from the identification information storage component connected to the transmission component, and outputs the image signal to the connected transmission component in accordance with at least a portion of the acquired identification information.

A second aspect of the present invention is to provide a signal communication system comprising: an information processing device, which outputs an image signal; an image display device, which displays an image based on the image signal; and a signal communication apparatus, wherein the signal communication apparatus includes: a transmission component, which is connectable with the information processing device and a signal propagation medium, and which transmits the image signal, which is inputted from the information processing device, through the connected signal propagation medium; a reception component, which is connectable with the image display device and the signal propagation medium, and which receives the image signal transmitted from the transmission component through the connected signal propagation medium, and outputs the image signal to the connected image display device; and an identification information storage component which is removably attached to the transmission component, the identification information storage component storing identification information for identifying the image display device, and the information processing device acquires the identification information from the identification information storage component connected to the transmission component, and outputs the image signal to the connected transmission component in accordance with at least a portion of the acquired identification information.

BRIEF DESCRIPTION OF THE DRAWINGS

An embodiment of the present invention will be described in detail based on the following figures, wherein.

DETAILED DESCRIPTION OF THE INVENTION

Herebelow, an embodiment of the present invention will be described with reference to the drawings.

Figure 1:
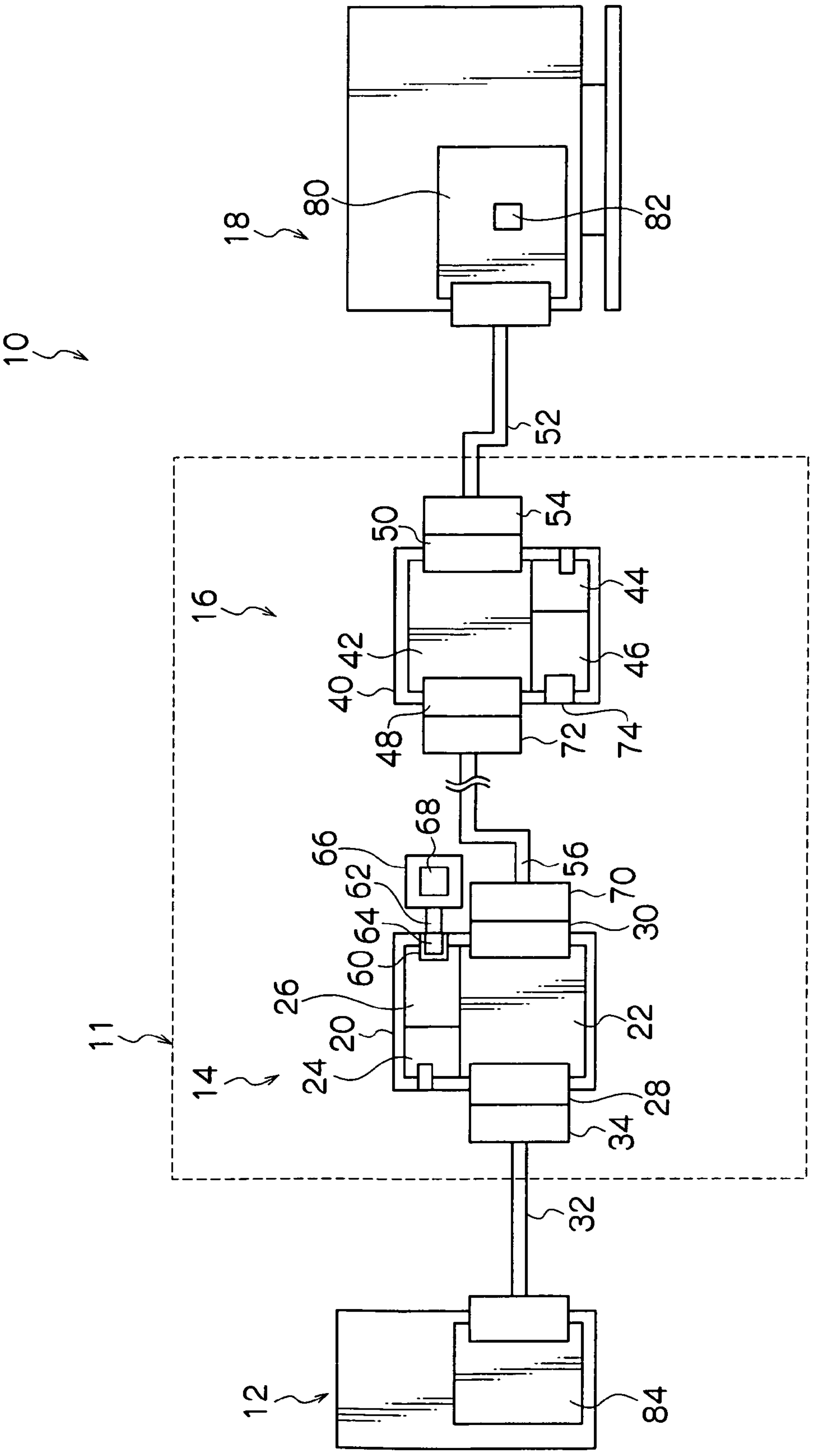
FIG. 1 is a schematic view showing structure of a signal communication system relating to the embodiment of the present invention.

As shown in FIG. 1, a signal communication system 10 relating to the present embodiment is provided with a host computer 12, a signal communication apparatus 11 and an image display device 18. The host computer 12 outputs DVI electronic signals, which are electronic signals representing image information. The signal communication apparatus 11 propagates the DVI electronic signals, which are inputted thereto from the host computer 12, to the image display device 18. The image display device 18 displays images based on the DVI electronic signals propagated thereto through the signal communication apparatus 11.

The signal communication apparatus 11 is provided with a transmission module 14, a reception module 16 and an optical fiber cable 56. The transmission module 14 transmits signals based on the DVI electronic signals inputted from the host computer 12. The reception module 16 receives the signals transmitted from the transmission module 14. The optical fiber cable 56 connects the transmission module 14 with the reception module 16. Furthermore, the host computer 12 and the transmission module 14 are connected by a DVI metal cable 32, and the reception module 16 and the image display device 18 are connected by a DVI metal cable 52.

The transmission module 14 is provided with a box-like casing body 20. An electronic-optical conversion circuit board 22, a power supply circuit 24 and a DDC transmission/reception circuit 26 are disposed inside the casing body 20. The electronic-optical conversion circuit board 22 converts respective DVI electronic signals for Red, Green, Blue and Clock to optical signals and transmits the optical signals. The power supply circuit 24 supplies electrical power to the electronic-optical conversion circuit board 22. The DDC transmission/reception circuit 26 transmits/receives DDC signals.

At one end of the electronic-optical conversion circuit board 22, a female electronic connector 28 (a DVI connector) at which electronic signals are inputted is mounted, and a female optical connector 30 at which optical signals are outputted is mounted at another end of the electronic-optical conversion circuit board 22. The female optical connector 30 is provided with a frame-like connector-fitting portion, inside which light-emitting elements (for example, laser diodes such as VCSELs or the like) which output the optical signals are plurally incorporated. A male electronic connector 34 of the DVI metal cable 32, which is connected with the host computer 12, is connected at the female electronic connector 28.

The electronic-optical conversion circuit board 22 and the DDC transmission/reception circuit 26 are connected to one another inside the casing body 20 by a female electronic connector and a male electronic connector.

At the electronic-optical conversion circuit board 22, a plurality of electronic-optical conversion circuits are provided, to correspond to a variety of signals that are propagated by the DVI metal cable 32. For example, with an ordinary DVI metal cable, four categories of signal—Red, Green, Blue and Clock—are propagated. Therefore, four of the electronic-optical conversion circuits are provided so as to correspond, respectively, with the four kinds of signal.

The power supply circuit 24 is connected, via an AC adapter, to an AC power supply. The power supply circuit 24 is formed to supply DC power to the electronic-optical conversion circuits of the electronic-optical conversion circuit board 22.

Figure 2:
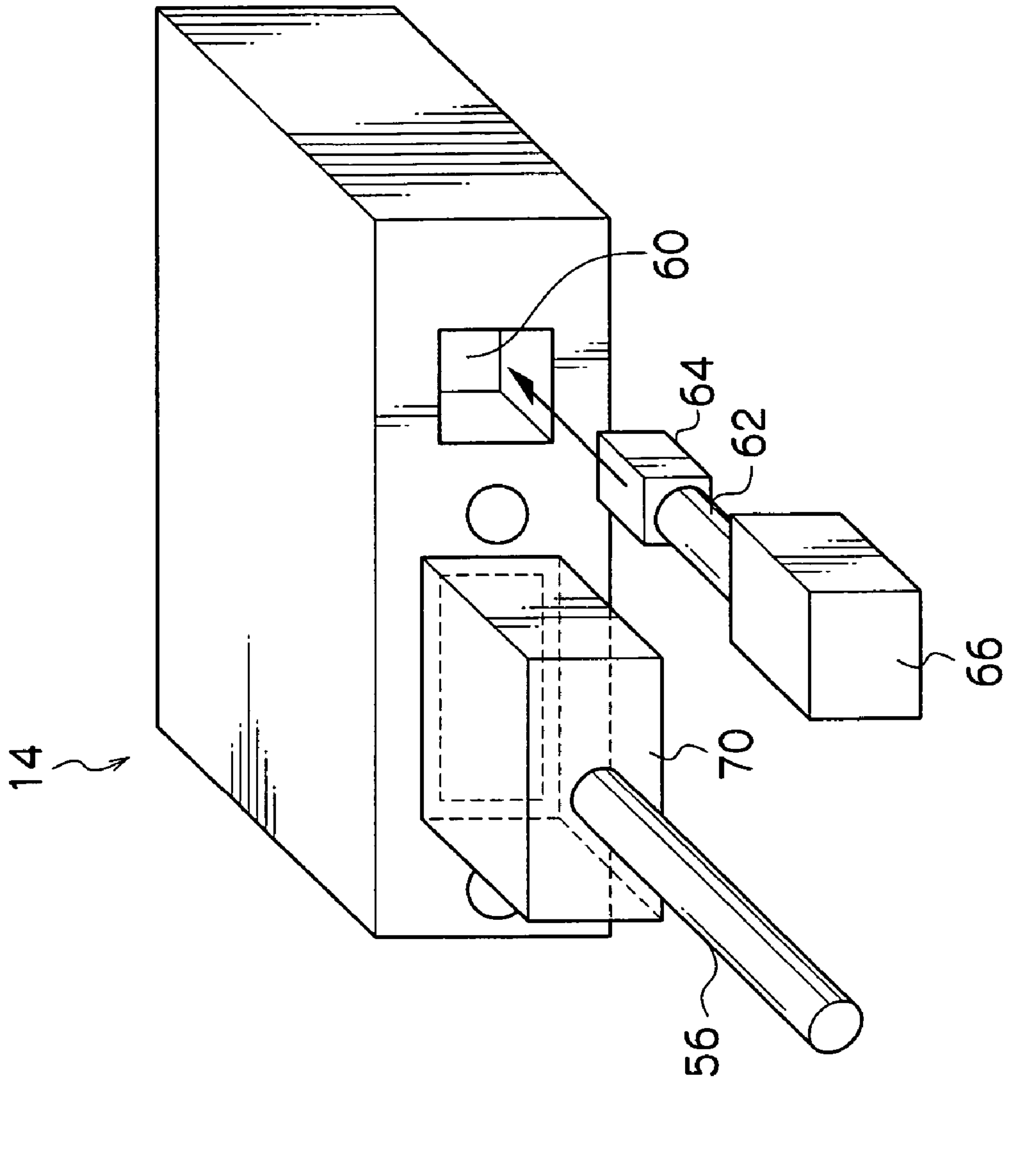
FIG. 2 is a perspective view showing structure of a transmission module and an EDID information storage device relating to the embodiment of the present invention.

A connector 60 is mounted at the DDC transmission/reception circuit 26. As shown in FIG. 2, a plug 64, which is provided at one end of a metal cable 62 and engages the connector 60, is attached to the connector 60 from outside the casing body 20. The connector 60 can be detached from the plug 64. The other end of the metal cable 62 is connected to an EDID information storage device 66. An ROM 68, in which EDID information has been stored in advance, is provided in the EDID information storage device 66, as shown in FIG. 1. A modular type connector can be employed as the connector 60. However, any type connector can be employed as the connector 60, when it matches a terminal of the plug 64.

At the plug 64, terminals are provided to correspond to each of a voltage level signal (5V), hot plug detection (HPD) of DDC signals, DDC signal data and a DDC signal clock. EDID information, which is memorized at a ROM 68, is constituted by, for example, information representing a model name of the image display device 18, and setting values such as resolution and the like.

The reception module 16 is provided with a box-like casing body 40. An optical-electronic conversion circuit board 42, a power supply circuit 44 and a DDC transmission/reception circuit 46 are disposed inside the casing body 40. The optical-electronic conversion circuit board 42 converts the respective DVI optical signals for Red, Green, Blue and Clock that are received to DVI electronic signals and outputs the electronic signals. The power supply circuit 44 supplies electrical power to the optical-electronic conversion circuit board 42. The DDC transmission/reception circuit 26 transmits/receives DDC signals.

At one end of the optical-electronic conversion circuit board 42, a female optical connector 48 (a DVI connector) at which optical signals are inputted is mounted, and a female electronic connector 50 at which electronic signals are outputted is mounted at another end of the optical-electronic conversion circuit board 42. The female optical connector 48 is provided with a frame-like connector-fitting portion, inside which light detection elements (for example, photodiodes) which receive the optical signals are plurally incorporated. A male electronic connector 54 of the DVI metal cable 52, which is connected with the image display device 18, is connected at the female electronic connector 50.

The optical-electronic conversion circuit board 42 and the DDC transmission/reception circuit 46 are connected to one another inside the casing body 40 by a female electronic connector and a male electronic connector.

At the optical-electronic conversion circuit board 42, similarly to the electronic-optical conversion circuits, a plurality of optical-electronic conversion circuits are provided to correspond to the variety of signals. The optical fiber cable 56 is also plurally provided to correspond to the varieties of signals. For example, in the case of four kinds of signal, Red, Green, Blue and Clock, four optical-electronic conversion circuits are provided so as to respectively correspond with the four kinds of signal, and four of the optical fiber cable 56 are provided. Here, if the four kinds of optical signal are converted to one kind or two kinds, by parallel-serial conversion, a wavelength multiplexing technique or the like, it is possible to provide only one or two of the optical fiber cable 56 to correspond to this variety of optical signals.

The power supply circuit 44 is connected to an AC power supply via an AC adapter. The power supply circuit 44 is formed to supply DC power to the optical-electronic conversion circuits of the optical-electronic conversion circuit board 42.

A male optical connector 70, which is provided at one end of the optical fiber cable(s) 56, is connected to the female optical connector 30 of the transmission module 14. A male optical connector 72, which is provided at the other end of the optical fiber cable(s) 56, is connected to the female optical connector 48 of the reception module 16. A length of the optical fiber cable 56 can be, for example, 100 meters and long-distance signal propagation can be performed. Note that a connector 74 is provided at the DDC transmission/reception circuit 46 of the reception module 16 but this connector 74 is in a state in which nothing is connected thereat.

A driving circuit 80 is provided at the image display device 18 for driving various parts of the image display device 18. A memory 82, which stores EDID information of the image display device 18, is provided at the driving circuit 80. The EDID information stored at the memory 82 is the same as the EDID information that has been stored beforehand at the ROM 68 of the EDID information storage device 66. Herein, display devices with conventionally known common structures can be employed for the image display device 18; detailed descriptions of other structures thereof will not be given for the present embodiment.

At the host computer 12, an image processing board 84 for outputting the DVI electronic signals representing image information is provided. The DVI electronic signals from the image processing board 84 are inputted to the transmission module 14 via the DVI metal cable 32. Herein, personal computers and the like with conventionally known common structures can be employed for the host computer 12; detailed descriptions of other structures thereof will not be given for the present embodiment.

Next, operations of the signal communication system 10 relating to the present embodiment will be described. First, when power supplies to each of the host computer 12, the transmission module 14, the reception module 16 and the image display device 18 are turned on, the host computer 12 outputs control information to the EDID information storage device 66, via the DDC transmission/reception circuit 26 of the transmission module 14, in order to acquire the EDID information of the image display device 18.

When the EDID information storage device 66 receives the control information for acquiring the EDID information, the EDID information storage device 66 outputs a signal representing the EDID information stored at the ROM 68, and the host computer 12 acquires the EDID information via the metal cable 62, the DDC transmission/reception circuit 26 and the DVI metal cable 32.

When the host computer 12 has acquired at least a portion of the EDID information, the host computer 12 identifies that the image display device 18 is connected and, on the basis of the acquired EDID information, identifies the model name, setting values and the like of the image display device 18. On the basis of image information, the host computer 12 generates DVI electronic signals to suit specifications of the image display device 18, and outputs the DVI electronic signals. These DVI electronic signals are inputted to the transmission module 14 via the DVI metal cable 32, converted to DVI optical signals and outputted by the electronic-optical conversion circuit board 22, and transmitted through the optical fiber cable 56 to the reception module 16.

Then, at the reception module 16, the DVI optical signals are converted to DVI electronic signals by the optical-electronic conversion circuit board 42, and the DVI electronic signals are outputted through the DVI metal cable 52 to the image display device 18. At the image display device 18, an image based on the DVI electronic signals is displayed.

Now, when, because of a change of the image display device 18 or the like, the EDID information stored at the EDID information storage device 66 and the EDID information of the image display device 18 will not match, the plug 64 is detached from the connector 60 of the transmission module 14, the EDID information storage device 66 that was connected is substituted with another of the EDID information storage device 66, at which the EDID information stored in the memory 82 of the current image display device 18 is memorized, and the substitute EDID information storage device 66 is connected to the transmission module 14.

Hence, when power to all the devices is turned on, in the same manner as described above, the host computer 12 acquires the EDID information stored at the newly connected EDID information storage device 66, thus acquiring the EDID information stored at the memory 82 of the image display device 18. The host computer 12 identifies the model name, setting values and the like of the image display device 18, and generates and outputs DVI electronic signals to suit the specifications of the image display device 18.

Further, if a rewriting device which is capable of rewriting the EDID information stored at the ROM 68 of the EDID information storage device 66 is employed, it will be possible to alter the EDID information stored at the EDID information storage device 66 connected to the transmission module 14 without replacing the EDID information storage device 66. In such a case, the plug 64 of the metal cable 62 connected to the EDID information storage device 66 is detached from the connector 60, the plug 64 of the metal cable 62 of the EDID information storage device 66 is plugged into the rewriting device, and EDID information stored at the rewriting device is copied to the ROM 68 of the EDID information storage device 66. Thus, the EDID information can be overwritten.

As described above, according to the signal communication system relating to the present embodiment, because an EDID information storage device is attached at a transmission module, a host computer can acquire EDID information safely and reliably. Furthermore, because the EDID information storage device is attached to be removable from the transmission module, it is possible to replace the EDID information storage device easily when the EDID information changes. Further yet, because there is no need for a cable between the transmission module and a reception module for acquisition of the EDID information, it is possible to perform long-distance communication of DVI signals.

Further again, because the EDID information storage device is attached at an exterior portion of the transmission module, the EDID information storage device can be detached easily.

Further still, because an optical fiber cable is employed, it is possible to perform stable long-distance communication.

Anyway, for the embodiment described above an example case has been described in which a plug of a metal cable connecting with an EDID information storage device is attached to a connector provided at an exterior portion of a casing body of a transmission module. However, the connector may be provided at an interior portion of the casing body of the transmission module, and the EDID information storage device and the metal cable may be accommodated inside the casing body. Such a case is possible when the casing body of the transmission module is structured to be openable and is structured such that the plug of the metal cable connecting with the EDID information storage device can be detached when the casing body is opened.

Further, a conventional transmission module that is provided with an electronic-optical conversion circuit board may be employed as the transmission module. Such a case is possible when a plug of the EDID information storage device is structured so as to fit with a connector of the transmission module and the EDID information storage device can be attached to the transmission model. Consequently, because it is possible to utilize existing devices, the transmission module can be structured at low cost.

The first aspect of the present invention is to provide a signal communication apparatus comprising: a transmission component, which is connectable with an information processing device and a signal propagation medium, and which transmits an inputted image signal through the connected signal propagation medium; a reception component, which is connectable with an image display device and the signal propagation medium, and which receives the image signal transmitted from the transmission component through the connected signal propagation medium, and outputs the image signal to the connected image display device; and an identification information storage component which is removably attached to the transmission component, the identification information storage component storing identification information for identifying the image display device, wherein the information processing device acquires the identification information from the identification information storage component connected to the transmission component, and outputs the image signal to the connected transmission component in accordance with at least a portion of the acquired identification information.

The second aspect of the present invention is a signal communication system comprising: an information processing device, which outputs an image signal; an image display device, which displays an image based on the image signal; and a signal communication apparatus, wherein the signal communication apparatus includes: a transmission component, which is connectable with the information processing device and a signal propagation medium, and which transmits the image signal, which is inputted from the information processing device, through the connected signal propagation medium; a reception component, which is connectable with the image display device and the signal propagation medium, and which receives the image signal transmitted from the transmission component through the connected signal propagation medium, and outputs the image signal to the connected image display device; and an identification information storage component which is removably attached to the transmission component, the identification information storage component storing identification information for identifying the image display device, and the information processing device acquires the identification information from the identification information storage component connected to the transmission component, and outputs the image signal to the connected transmission component in accordance with at least a portion of the acquired identification information.

According to the present invention, the information processing device acquires identification information which identifies the image display device from the identification information storage component, which is connected to the transmission component connected to the information processing device. In accordance with at least a portion of the acquired identification information, the information processing device outputs image signals to the transmission component connected thereto. Then, the transmission component transmits the inputted image signals through the signal propagation medium connected to the transmission component. The reception component receives the image signals that are transmitted from the transmission component through the signal propagation medium connected therebetween, and outputs the image signals to the image display device connected to the reception component.

Thus, because the identification information storage component is attached to the transmission component, the image processing device can acquire the identification information safely and reliably. Furthermore, because the identification information storage component is attached to be removable from the transmission component, it is possible to replace the identification information storage component easily if the identification information is to change. Further yet, because there is no need for a cable from the image display device for acquisition of the EDID information, it is possible to implement long-distance communication of image signals.

The identification information relating to the present invention is the same as information provided at the connected image display device.

Further, the identification information storage component relating to the present invention may be removably attached at an exterior portion of the transmission component. Hence, detachment of the identification information storage component is made even easier.

The identification information storage component may store EDID information for identifying the image display device.

Further still, the signal propagation medium relating to the present invention may be an optical fiber cable, with the transmission component converting an image electronic signal, which is the inputted electronic signal, to an image optical signal and transmitting the image optical signal, and the reception component receiving the image optical signal transmitted from the transmission component, converting the image optical signal to an image electronic signal, and outputting the image electronic signal to the image display device. When the signal propagation medium is an optical fiber cable, it is possible to perform long-distance communication of the image signals reliably.

Furthermore, the above-mentioned optical fiber cable can be formed to lengths of 100 meters or more.

As has been described above, according to the signal communication apparatus and signal communication system of the present invention, benefits are provided in that, because an identification information storage component is attached to a transmission component, an information processing device can acquire the identification information safely and reliably, and, because the identification information storage component is attached to the transmission component to be removable, it is possible to replace the identification information storage component easily when the identification information is to change. Further, a benefit is provided in that, because a cable from the image processing device for acquiring the identification information is not necessary, it is possible to implement long-distance communication of image signals.

What is claimed is:

1. A signal communication apparatus comprising:

a transmission component connected with an information processing device via a first cable, the transmission component being outside and separate from the information processing device, the transmission component also being connected with a signal propagation medium, and the transmission component transmitting an image signal inputted via the first cable through the connected signal propagation medium;

a reception component connected with an image display device via a second cable, the image display device having a plurality of resolution modes, the reception component being connected with the signal propagation medium to receive the image signal transmitted from the transmission component through the connected signal propagation medium, and the reception component outputting the image signal to the connected image display device via the second cable; and an extended display identification data information storage component which is removably attached to the transmission component, the extended display identification data information storage component storing extended display identification data information for identifying a particular model name and particular setting values of the image display device, wherein the extended display identification data information storage component is located outside of the image display device, and the information processing device acquires the extended display identification data information from the extended display identification data information storage component connected to the transmission component, via the first cable, and the information processing device outputs the image signal via the first cable to the connected transmission component in a format corresponding to one of the resolution modes of the image display device, in accordance with at least a portion of the acquired extended display identification data information.

2. The signal communication apparatus of claim 1, wherein the extended display identification data information is the same as information provided at the connected image display device.

3. The signal communication apparatus of claim 1, wherein the extended display identification data information storage component is replaced with another of the extended display identification data information storage component, at which information the same as information provided at the connected image display device is stored, such that the extended display identification data information is the same as the information provided at the connected image display device.

4. The signal communication apparatus of claim 1, wherein the extended display identification data information storage component is rewritable and the extended display identification data information stored at the extended display identification data information storage component is rewritten so as to be the same as information provided at the connected image display device.

5. The signal communication apparatus of claim 1, wherein the extended display identification data information storage component is removably attached at an exterior portion of the transmission component.

6. The signal communication apparatus of claim 1, wherein the extended display identification data information storage component is removably attached at an interior portion of the transmission component.

7. The signal communication apparatus of claim 1, wherein the signal propagation medium includes an optical fiber cable, the transmission component converts an electronic signal, which is the inputted image signal, to an optical signal and transmits the optical signal, and the reception component receives the optical signal transmitted from the transmission component, converts the optical signal to an electronic signal, and outputs the electronic signal to the image display device to serve as the image signal.

8. The signal communication apparatus of claim 7, wherein a length of the optical fiber cable is 100 meters or more.

9. A signal communication system comprising:

an information processing device, which outputs an image signal;

an image display device, which displays an image based on the image signal; and a signal communication apparatus, wherein the signal communication apparatus includes:

a transmission component connected with the information processing device via a first cable, the transmission component being outside and separate from the information processing device and receiving the output image signal via the first cable, the transmission component also being connected with a signal propagation medium, the transmission component transmitting the image signal through the connected signal propagation medium;

a reception component connected with the image display device via a second cable, the image display device having a plurality of resolution modes, the reception component being connected with the signal propagation medium to receive the image signal transmitted from the transmission component through the connected signal propagation medium, and the reception component outputting the image signal to the connected image display device via the second cable; and an extended display identification data information storage component which is removably attached to the transmission component, the extended display identification data information storage component storing extended display identification data information for identifying a particular model name and particular setting values of the image display device, wherein the extended display identification data information storage component is located outside of the image display device, and the information processing device acquires the extended display identification data information from the extended display identification data information storage component connected to the transmission component, via the first cable, and the information processing device outputs the image signal via the first cable to the connected transmission component in a format corresponding to one of the resolution modes of the image display device, in accordance with at least a portion of the acquired extended display identification data information.

10. The signal communication system of claim 9, wherein the extended display identification data information is the same as information provided at the connected image display device.

11. The signal communication system of claim 9, wherein the image display device can be substituted, and the extended display identification data information storage component is replaced with another of the extended display identification data information storage component at which information the same as information provided at the substitute image display device is stored, such that the extended display identification data information is the same as the information provided at the substitute image display device.

12. The signal communication system of claim 9, wherein the image display device can be substituted, the extended display identification data information storage component is rewritable and the extended display identification data information stored at the extended display identification data information storage component is rewritten so as to be the same as information provided at the substitute image display device.

13. The signal communication system of claim 9, wherein the extended display identification data information storage component is removably attached at an exterior portion of the transmission component.

14. The signal communication system of claim 9, wherein the extended display identification data information storage component is removably attached at an interior portion of the transmission component.

15. The signal communication system of claim 9, wherein the signal propagation medium includes an optical fiber cable, the transmission component converts an electronic signal, which is the inputted image signal, to an optical signal and transmits the optical signal, and the reception component receives the optical signal transmitted from the transmission component, converts the optical signal to an electronic signal, and outputs the electronic signal to the image display device to serve as the image signal.

16. The signal communication system of claim 15, wherein a length of the optical fiber cable is 100 meters or more.

17. The signal communication apparatus of claim 1, wherein the transmission component includes a first connector that is exposed outside.

18. The signal communication apparatus of claim 1, wherein the extended display identification data information storage component includes:

a read-only memory in which extended display identification data information has been stored in advance, and a second connector that is exposed outside.

19. The signal communication apparatus of claim 1, wherein the extended display identification data information storage component can be attached and detached from the transmission component by connecting or disconnecting the first and second connectors, so that the extended display identification data information storage component can be replaced with another extended display identification data information storage component when the extended display identification data information that has been stored in the extended display identification data storage component and information for identifying the image display device that has been stored in the image display device do not match.

* * * * *